(12) United States Patent
Katayama et al.

(10) Patent No.: US 11,419,113 B2
(45) Date of Patent: Aug. 16, 2022

(54) WIRELESS COMMUNICATION METHOD, CONTROL DEVICE AND WIRELESS COMMUNICATION SYSTEM

(71) Applicant: NIPPON TELEGRAPH AND TELEPHONE CORPORATION, Tokyo (JP)

(72) Inventors: Yohei Katayama, Musashino (JP); Atsushi Taniguchi, Musashino (JP); Kenji Shimizu, Musashino (JP); Takahiro Yamazaki, Musashino (JP); Maiko Naya, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 127 days.

(21) Appl. No.: 17/047,337

(22) PCT Filed: Apr. 4, 2019

(86) PCT No.: PCT/JP2019/014958
§ 371 (c)(1),
(2) Date: Oct. 13, 2020

(87) PCT Pub. No.: WO2019/203007
PCT Pub. Date: Oct. 24, 2019

(65) Prior Publication Data
US 2021/0227538 A1    Jul. 22, 2021

(30) Foreign Application Priority Data
Apr. 16, 2018 (JP) .............................. JP2018-078720

(51) Int. Cl.
*H04W 72/04* (2009.01)
*H04W 76/10* (2018.01)

(52) U.S. Cl.
CPC ....... *H04W 72/0446* (2013.01); *H04W 76/10* (2018.02)

(58) Field of Classification Search
CPC . H04W 72/0446; H04W 76/10; H04W 16/10; H04W 88/08; H04M 3/00
See application file for complete search history.

(56) References Cited

U.S. PATENT DOCUMENTS 7,447,497 B2 * 11/2008 Okita ........................ G06F 8/65
455/418

FOREIGN PATENT DOCUMENTS

JP          2013120973 A    6/2013
WO   WO-2014147796 A1 *  9/2014   ............ H04W 36/22

OTHER PUBLICATIONS

Terumi, Sunaga et al. "Technology and device R & D for realizing terminals for fourth-generation mobile communication systems with software wireless terminals." National Institute of Information and Communications Technology Quarterly Report, vol. 52, (2006), pp. 37-44. Machine translation attached.

* cited by examiner

*Primary Examiner* — Mohammad S Anwar

(57) ABSTRACT

There is provided a wireless communication method in a wireless communication system including a plurality of base station apparatuses, a plurality of wireless signal processing apparatuses configured to perform signal processing that corresponds to each of a plurality of wireless schemes, and a control apparatus configured to control a transmission timing of signals in the base station apparatus and the wireless signal processing apparatus, the method including: determining a combination of the base station apparatus and the wireless signal processing apparatus that perform communication at each predetermined time by the control apparatus such that there is less overlap in time to establish a communication path between the wireless signal processing apparatus and each of a plurality of base station apparatuses that use the same wireless signal processing apparatus, in which the base station apparatus and the wireless signal processing apparatus perform communication by switching a determined combination of the communication paths and any one or all of a radio frequency of each base station apparatus and a wireless bandwidth of each base station apparatus over time.

6 Claims, 14 Drawing Sheets

(A)

| AREA | BASE STATION APPARATUS | PHASE |
|---|---|---|
| AREA α | BASE STATION APPARATUS 20α1 | + 0 SLOT |
| | BASE STATION APPARATUS 20α2 | + 1 SLOT |
| | BASE STATION APPARATUS 20α3 | + 2 SLOT |
| | BASE STATION APPARATUS 20α4 | + 3 SLOT |
| | BASE STATION APPARATUS 20α5 | + 4 SLOT |
| | BASE STATION APPARATUS 20α6 | + 5 SLOT |
| ... | ... | ... |

51

(B)

| AREA | FACING WIRELESS SIGNAL PROCESSING APPARATUS AT EACH COMMUNICATION PATH SETTING TIME (NUMBER OF SLOTS IS VARIABLE FOR EACH AREA) | | | | | |
|---|---|---|---|---|---|---|
| | FIRST SLOT | SECOND SLOT | THIRD SLOT | FOURTH SLOT | FIFTH SLOT | SIXTH SLOT |
| AREA α | WIRELESS SIGNAL PROCESSING APPARATUS 30(1)1 | WIRELESS SIGNAL PROCESSING APPARATUS 30(2)1 | WIRELESS SIGNAL PROCESSING APPARATUS 30(3)2 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(3)1 |
| ... | ... | ... | ... | ... | ... | ... |

| AREA | BASE STATION APPARATUS | FACING WIRELESS SIGNAL PROCESSING APPARATUS AT EACH COMMUNICATION PATH SETTING TIME | | | | | |
|---|---|---|---|---|---|---|---|
| | | FIRST SLOT | SECOND SLOT | THIRD SLOT | FOURTH SLOT | FIFTH SLOT | SIXTH SLOT |
| AREA α | BASE STATION APPARATUS 20α1 | WIRELESS SIGNAL PROCESSING APPARATUS 30(1)1 | WIRELESS SIGNAL PROCESSING APPARATUS 30(1)1 | WIRELESS SIGNAL PROCESSING APPARATUS 30(2)2 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(3)1 |
| | BASE STATION APPARATUS 20α2 | WIRELESS SIGNAL PROCESSING APPARATUS 30(3)1 | WIRELESS SIGNAL PROCESSING APPARATUS 30(1)1 | WIRELESS SIGNAL PROCESSING APPARATUS 30(2)2 | WIRELESS SIGNAL PROCESSING APPARATUS 30(2)2 | WIRELESS SIGNAL PROCESSING APPARATUS 30(2)2 | WIRELESS SIGNAL PROCESSING APPARATUS 30(3)1 |
| | BASE STATION APPARATUS 20α3 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(2)1 | WIRELESS SIGNAL PROCESSING APPARATUS 30(1)1 | WIRELESS SIGNAL PROCESSING APPARATUS 30(2)1 | WIRELESS SIGNAL PROCESSING APPARATUS 30(3)1 |
| | BASE STATION APPARATUS 20α4 | WIRELESS SIGNAL PROCESSING APPARATUS 30(2)1 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(2)2 | WIRELESS SIGNAL PROCESSING APPARATUS 30(2)1 |
| | BASE STATION APPARATUS 20α5 | WIRELESS SIGNAL PROCESSING APPARATUS 30(2)2 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(2)1 | WIRELESS SIGNAL PROCESSING APPARATUS 30(3)1 |
| | BASE STATION APPARATUS 20α6 | WIRELESS SIGNAL PROCESSING APPARATUS 30(2)1 | WIRELESS SIGNAL PROCESSING APPARATUS 30(2)2 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(3)1 | WIRELESS SIGNAL PROCESSING APPARATUS 30(3)1 |
| ... | ... | ... | ... | ... | ... | ... | ... |

| WIRELESS SCHEME | BASE STATION APPARATUS CONTROL INFORMATION | | | COMMUNICATION PATH CONTROL INFORMATION | WIRELESS SIGNAL PROCESSING APPARATUS |
|---|---|---|---|---|---|
| | CENTER FREQUENCY | BANDWIDTH | ... | COMMUNICATION METHOD | |
| WIRELESS SCHEME "(1)" | 920 MHz | 100 kHz | ... | UNICAST | WIRELESS SIGNAL PROCESSING APPARATUS 30(1)1 |
| WIRELESS SCHEME "(2)" | 5.25 GHz | 100 MHz | ... | UNICAST | WIRELESS SIGNAL PROCESSING APPARATUS 30(2)1 |
| | | | | UNICAST | WIRELESS SIGNAL PROCESSING APPARATUS 30(2)2 |
| WIRELESS SCHEME "(3)" | ... | ... | ... | MULTICAST | WIRELESS SIGNAL PROCESSING APPARATUS 30(3)1 |
| ... | ... | ... | ... | ... | ... |

54

(B)

| WIRELESS SIGNAL PROCESSING APPARATUS | BASE STATION APPARATUS | COMMUNICATION PATH DELAY | ADJUSTMENT DELAY |
|---|---|---|---|
| WIRELESS SIGNAL PROCESSING APPARATUS 30(1)1 | BASE STATION APPARATUS 20α1 | 0.1 UT | +0.2 UT |
| | BASE STATION APPARATUS 20α2 | 0.2 UT | +0.1 UT |
| | BASE STATION APPARATUS 20α3 | 0.3 UT | +0.0 UT |
| | BASE STATION APPARATUS 20α4 | 0.1 UT | +0.2 UT |
| | BASE STATION APPARATUS 20α5 | 0.2 UT | +0.1 UT |
| | BASE STATION APPARATUS 20α6 | 0.3 UT | +0.0 UT |
| | ... | ... | ... |
| ... | ... | ... | ... |

| WIRELESS SCHEME | AREA | COMMUNICATION PATH SETTING TIME INFORMATION |
|---|---|---|
| WIRELESS SCHEME "(1)" | AREA α | FIRST SLOT |
| | AREA β | ... |
| | ... | ... |
| WIRELESS SCHEME "(2)" | AREA α | SECOND SLOT |
| | AREA γ | ... |
| | ... | ... |
| WIRELESS SCHEME "(3)" | AREA α | THIRD SLOT |
| | ... | ... |
| ... | ... | ... |

56

(B)

| WIRELESS SCHEME | WIRELESS SIGNAL PROCESSING LOAD PER SLOT |
|---|---|
| WIRELESS SCHEME "(1)" | 0.01 VM |
| WIRELESS SCHEME "(2)" | 0.7 VM |
| WIRELESS SCHEME "(3)" | 0.1 VM |
| ... | ... |

57

(C)

| APPARATUS | ADDRESS |
|---|---|
| BASE STATION APPARATUS 20α1 | BASE STATION APPARATUS 20α1 ADDRESS |
| ... | ... |
| WIRELESS SIGNAL PROCESSING APPARATUS 30(1)1 | WIRELESS SIGNAL PROCESSING APPARATUS 30(1)1 ADDRESS |
| ... | ... |

| VIRTUALIZATION APPARATUS | VM | ACTIVATION SYSTEM |
|---|---|---|
| VIRTUALIZATION APPARATUS 1 | VM1-1 | WIRELESS SIGNAL PROCESSING APPARATUS 30(1)1 |
| | VM1-2 | WIRELESS SIGNAL PROCESSING APPARATUS 30(2)1 |
| | ... | ... |
| ... | ... | ... |

59

(B)

| CONDITION | EVENT | EXECUTION TARGET AREA |
|---|---|---|
| TIME **:00 to **:10 | WIRELESS SCHEME "A" OPERATION | AREA α, AREA β, ... |
| TIME **:10 to **:00 | WIRELESS SCHEME "A" DEACTIVATE | AREA α, AREA β, ... |
| ... | ... | ... |

| VARIABLE | VALUE |
|---|---|
| HOST APPARATUS ADDRESS | BASE STATION APPARATUS 20a1 ADDRESS |
| ENTRY BEING SELECTED | ENTRY Aa1-4 |
| REMAINING TIME SLOT | SECOND SLOT |
| FACING WIRELESS SIGNAL PROCESSING APPARATUS | WIRELESS SIGNAL PROCESSING APPARATUS 30(3)1 ADDRESS |
| ... | ... |

| TIME SLOT | COMMUNICATION PATH SETTING TIME INFORMATION | COMMUNICATION PATH CONTROL INFORMATION | RADIO FREQUENCY CONTROL INFORMATION | | |
|---|---|---|---|---|---|
| | | FACING WIRELESS SIGNAL PROCESSING APPARATUS | CENTER FREQUENCY | BANDWIDTH | ... |
| ENTRY Aα1-1 | FIRST SLOT | WIRELESS SIGNAL PROCESSING APPARATUS 30(1)1 ADDRESS | 920 MHz | 100 kHz | ... |
| ENTRY Aα1-2 | FIRST SLOT | WIRELESS SIGNAL PROCESSING APPARATUS 30(2)1 ADDRESS | 5.25 GHz | 160 MHz | ... |
| ENTRY Aα1-3 | FIRST SLOT | WIRELESS SIGNAL PROCESSING APPARATUS 30(2)2 ADDRESS | 5.25 GHz | 160 MHz | ... |
| ENTRY Aα1-4 | THIRD SLOT | WIRELESS SIGNAL PROCESSING APPARATUS 30(3)1 ADDRESS | ... | ... | ... |
| ... | ... | ... | ... | ... | ... |

Fig. 10

| ENTRY OF TIME SLOT FOR PERFORMING TRANSMISSION | WIRELESS SIGNAL PROCESSING APPARATUS TO WHICH PACKET HAS TRANSMITTED | LIST OF TRANSMISSION WAITING PACKETS |
|---|---|---|
| ENTRY Aα1-1 | WIRELESS SIGNAL PROCESSING APPARATUS 30(1)1 ADDRESS | PACKET D(1)1-1, PACKET D(1)1-2, ... |
| ENTRY Aα1-2 | WIRELESS SIGNAL PROCESSING APPARATUS 30(2)1 ADDRESS | PACKET D(2)1-1, PACKET D(2)1-2, ... |
| ... | ... | ... |

Fig. 11

| WIRELESS SCHEME INDEPENDENT HEADER UNIT | | HEADER UNITS FOR EACH WIRELESS SCHEME | USER PACKET UNITS FOR EACH WIRELESS SCHEME | | |
|---|---|---|---|---|---|
| TRANSMISSION DESTINATION ADDRESS OF COMMUNICATION PATH | TRANSMISSION SOURCE ADDRESS OF COMMUNICATION PATH | | TRANSMISSION DESTINATION ADDRESS OF USER PACKET | TRANSMISSION SOURCE ADDRESS OF USER PACKET | PAYLOAD OF USER PACKET |

| AREA | VARIABLE | VALUE |
|---|---|---|
| COMMON | HOST APPARATUS ADDRESS | WIRELESS SIGNAL PROCESSING APPARATUS 30(3)1 ADDRESS |
| AREA α | ENTRY BEING SELECTED | ENTRY D(3)1-α1 |
| | REMAINING TIME SLOT | FIRST SLOT |
| | ... | ... |
| ... | ... | ... |

| AREA | TIME SLOT | COMMUNICATION PATH SETTING TIME INFORMATION | COMMUNICATION PATH CONTROL INFORMATION FACING BASE STATION APPARATUS |
|---|---|---|---|
| AREA α | ENTRY D(3)1-α1 | FIRST SLOT | BASE STATION APPARATUS 20α2 ADDRESS, BASE STATION APPARATUS 20α3 ADDRESS, BASE STATION APPARATUS 20α4 ADDRESS |
| | ENTRY D(3)1-α2 | FIRST SLOT | BASE STATION APPARATUS 20α3 ADDRESS, BASE STATION APPARATUS 20α4 ADDRESS, BASE STATION APPARATUS 20α5 ADDRESS |
| | ENTRY D(3)1-α3 | FIRST SLOT | BASE STATION APPARATUS 20α4 ADDRESS, BASE STATION APPARATUS 20α5 ADDRESS, BASE STATION APPARATUS 20α6 ADDRESS |
| | ENTRY D(3)1-α4 | FIRST SLOT | BASE STATION APPARATUS 20α5 ADDRESS, BASE STATION APPARATUS 20α6 ADDRESS, BASE STATION APPARATUS 20α1 ADDRESS |
| | ... | ... | ... |
| ... | ... | ... | ... |

| AREA | ENTRY OF TIME SLOT FOR PERFORMING TRANSMISSION | PACKET TRANSMISSION DESTINATION BASE STATION APPARATUS | LIST OF TRANSMISSION WAITING PACKETS |
|---|---|---|---|
| AREA α | ENTRY D(3)1-α1 | BASE STATION APPARATUS 20α2 ADDRESS | PACKET Aα2-1, PACKET Aα2-2, ... |
| | | BASE STATION APPARATUS 20α3 ADDRESS | PACKET Aα3-1, PACKET Aα3-2, ... |
| | | BASE STATION APPARATUS 20α4 ADDRESS | PACKET Aα4-1, PACKET Aα4-2, ... |
| | ... | ... | ... |
| ... | ... | ... | ... |

WIRELESS COMMUNICATION METHOD, CONTROL DEVICE AND WIRELESS COMMUNICATION SYSTEM

CROSS-REFERENCE TO RELATED APPLICATIONS

This application is a 371 U.S. National Phase of International Application No. PCT/JP2019/014958, filed on Apr. 4, 2019, which claims priority to Japanese Application No. 2018-078720 filed on Apr. 16, 2018. The entire disclosures of the above applications are incorporated herein by reference.

TECHNICAL FIELD

The present invention relates to a wireless communication method, a control apparatus, and a wireless communication system.

BACKGROUND ART

Recently, Internet of Things (IoT) devices with a wide variety of requirements have begun to be connected to networks by a wireless scheme appropriate for each requirement. Among a wide variety of requirements, when various types of wireless schemes example, wireless schemes such as LoRa (trade name, SIGFOX, or NB-IoT) used in the IoT devices having a low communication traffic volume are operated by different base station apparatuses (an access point, a wireless device, a slave station, or a remote radio unit (RRH)), the equipment utilization ratio of each base station apparatus is reduced, and there is a need for a large amount of installation cost, installation area, and operational cost. Because the base station apparatus is geographically distributed and installed, aggregation is less intense, and the installation cost, installation area, and operational cost per communication performance are higher than that of a wireless signal processing apparatus that is easily geographically aggregated.

In the related art, a wireless communication system that executes wireless signal processing in the base station apparatus (access point) or in both the wireless signal processing apparatus connected to the base station apparatus via a network, and the base station apparatus, has been studied (for example, refer to Patent Literature 1). In the wireless communication system described in Patent Literature 1, the wireless signal processing is performed on either or both the base station apparatus and the wireless signal processing apparatus in accordance with the wireless scheme used in the base station apparatus. For example, it is determined that the software that corresponds to the wireless signal processing performed on the base station apparatus is downloaded to the base station apparatus, the wireless signal processing is performed on the base station apparatus in a case where the software is downloaded, and the wireless signal processing is performed on the wireless signal processing apparatus in a case where the software is not downloaded.

In addition, in the above-described wireless communication system, in accordance with required delay, it is autonomously determined that the wireless signal processing is performed on one or both of the base station apparatus and the wireless signal processing apparatus. In this manner, the wireless communication system provides a unit that flexibly changes the wireless scheme by replacing software of the base station apparatus or the wireless signal processing apparatus. In general, although software replacement takes time, a problem that the non-wireless communication time for changing the wireless scheme is long occurs, but by using a combination of the base station apparatus (the software defined radio described in Non-Patent Literature 1) described in Non-Patent Literature 1, it is possible to shorten the non-communication time in software replacement for changing the wireless scheme. Specifically, in the wireless communication system using a combination of Patent Literature 1 and Non-Patent Literature 1, a wireless signal processing unit on an active system and on a standby system in the base station apparatus; and a switching unit, are provided, and it is possible to shorten the non-communication time by switching the active system and the standby system to each other by the switching unit after software replacement of the wireless signal processing unit of the standby system is completed.

CITATION LIST

Patent Literature

Patent Literature 1: JP 2013-120973 A

Non Patent Literature

Non-Patent Literature 1: p. 37-44, 2006, No. 4, Vol. 52, Quarterly report of National Institute of Information and Communications Technology "Technology and Devices for 4th Generation Mobile Communication Terminals using Software Defined Radio", SUNAGA Terumi, TERASHIMA Yoshiaki, KIYOHARA Ryozo, SUEMATSU Noriharu, ITAKURA Tetsuro, and HIROSE Yoshio

SUMMARY OF THE INVENTION

Technical Problem

However, in the wireless communication system using the combination of Patent Literature 1 and Non-Patent Literature 1, there is a problem in that the resources required for the wireless signal processing unit are doubled in the base station apparatus.

Considering the above-described situation, an object of the present invention is to provide a technology capable of shortening switching time in a wireless scheme while suppressing an increase in resources of a wireless signal processing unit in a base station apparatus.

Means for Solving the Problem

According to an aspect of the present invention, there is provided a wireless communication method in a wireless communication system including a plurality of base station apparatuses, a plurality of wireless signal processing apparatuses configured to perform signal processing that corresponds to each of a plurality of wireless schemes, and a control apparatus configured to control a transmission timing of signals in the base station apparatus and the wireless signal processing apparatus, the method including: determining a combination of the base station apparatus and the wireless signal processing apparatus that perform communication at each predetermined time by the control apparatus such that there is less overlap in time to establish a communication path between the wireless signal processing apparatus and each of a plurality of base station apparatuses that use a same wireless signal processing apparatus, in which the base station apparatus and the wireless signal processing apparatus perform communication by switching a determined combination of the communication paths, and any one or all of a radio frequency of each base station apparatus and a wireless bandwidth of each base station apparatus over time.

According to the aspect of the present invention, in the above-described wireless communication method, the control apparatus determines a number of the wireless signal processing apparatuses to activate based on a processing load of wireless signal processing and activates or deactivates the wireless signal processing apparatus in response to a determined number.

According to the aspect of the present invention, in the above-described wireless communication method, the base station apparatus transmits, via a radio frequency unit, signals received from each of the wireless signal processing apparatuses to an outside in accordance with a first time table that stores timing for outputting the signal, with respect to the radio frequency units that transmit signals received from each of the wireless signal processing apparatuses to the outside.

According to the aspect of the present invention, in the above-described wireless communication method, the wireless signal processing apparatus stores the signal received from the outside and the base station apparatus that is a transmission destination of the signal, in association with each other, and transmits the signal held to the base station apparatus that is a transmission destination at a time when the signal is transmitted to the base station apparatus that is the transmission destination.

According to another aspect of the present invention, there is provided a control apparatus in a wireless communication system including a plurality of base station apparatuses, a plurality of wireless signal processing apparatuses configured to perform signal processing that corresponds to each of a plurality of wireless schemes, and a control apparatus configured to control a transmission timing of signals in the base station apparatus and the wireless signal processing apparatus, the device including: a determination unit configured to determine a combination of the base station apparatus and the wireless signal processing apparatus that perform communication at each predetermined time such that there is less overlap in time to establish a communication path between the wireless signal processing apparatus and each of the plurality of base station apparatuses that use a same wireless signal processing apparatus; a table generation unit configured to generate a table instructing to perform communication by switching a determined combination of the communication paths between the base station apparatus and the wireless signal processing apparatus and any one or all of a radio frequency of each base station apparatus and a wireless bandwidth of each base station apparatus over time; and a control unit configured to control a transmission timing of the signal by setting control information based on the generated table to the base station apparatus and the wireless signal processing apparatus.

According to still another aspect of the present invention, there is provided a wireless communication system including a plurality of base station apparatuses, a plurality of wireless signal processing apparatuses configured to perform signal processing that corresponds to each of a plurality of wireless schemes, and a control apparatus configured to control a transmission timing of signals in the base station apparatus and the wireless signal processing apparatus, the system including: a determination unit configured to determine a combination of the base station apparatus and the wireless signal processing apparatus that perform communication at each predetermined time by the control apparatus such that there is less overlap in time to establish a communication path between the wireless signal processing apparatus and each of a plurality of base station apparatuses that use a same wireless signal processing apparatus, in which the base station apparatus and the wireless signal processing apparatus perform communication by switching a determined combination of the communication paths and any one or all of a radio frequency of each base station apparatus and a wireless bandwidth of each base station apparatus over time.

Effects of the Invention

According to the present invention, it becomes possible to shorten switching time in a wireless scheme while suppressing an increase in resources of a wireless signal processing unit in a base station apparatus.

BRIEF DESCRIPTION OF DRAWINGS

FIG. 3 is a set of diagrams illustrating a specific example of tables stored in a storage unit of the control apparatus.

FIG. 4 is a diagram illustrating a specific example of the table stored in the storage unit of the control apparatus.

FIG. 5 is a set of diagrams illustrating a specific example of the tables stored in the storage unit of the control apparatus.

FIG. 6 is a set of diagrams illustrating a specific example of the tables stored in the storage unit of the control apparatus.

FIG. 7 is a set of diagrams illustrating a specific example of the tables stored in the storage unit of the control apparatus.

FIG. 10 is a diagram illustrating an example of a time table.

FIG. 11 is a diagram illustrating an example of a table stored in a downlink transmission adjustment unit of the base station apparatus.

FIG. 12 is a diagram illustrating an example of a format of a packet exchanged over a network between the base station apparatus and a wireless signal processing apparatus.

FIG. 15 is a diagram illustrating an example of the time table.

FIG. 16 is a diagram illustrating an example of a table stored in a downlink transmission adjustment unit of the wireless signal processing apparatus.

DESCRIPTION OF EMBODIMENTS

Hereinafter, an embodiment of the present invention will be described in detail with reference to drawings.

Figure 1:
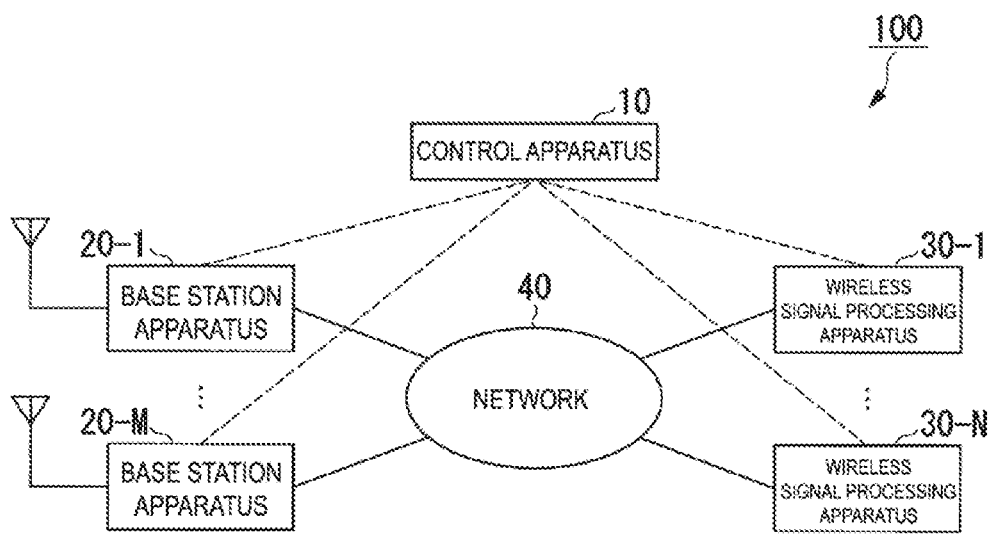
FIG. 1 is a configuration diagram illustrating a system configuration of a wireless communication system according to the present invention.

FIG. 1 is a configuration diagram illustrating a system configuration of a wireless communication system 100 according to the present invention.

The wireless communication system 100 includes a control apparatus 10, a plurality of base station apparatuses 20-1 to 20-M (M is an integer of 2 or greater) and a plurality of wireless signal processing apparatuses 30-1 to 30-N (where N is an integer of 2 or greater). The base station apparatus 20-1 to 20-M and the wireless signal processing apparatuses 30-1 to 30-N are connected to be capable of communicating with each other via a network 40. The network 40 is, for example, the Internet. In addition, in the following description, the base station apparatus will be described as the base station apparatus 20 in a case where the base station apparatuses 20-1 to 20-M are not distinguished. Furthermore, in the following description, the wireless signal processing apparatus will be described as a wireless signal processing apparatus 30 in a case where the wireless signal processing apparatuses 30-1 to 30-N are not distinguished.

The control apparatus 10 controls communication of the base station apparatus 20 and the wireless signal processing apparatus 30. For example, the control apparatus 10 controls the communication by determining a combination of the base station apparatus 20 and the wireless signal processing apparatus 30 such that there is less overlap in time to establish a communication path between the plurality of base station apparatuses 20 that use the same wireless signal processing apparatus 30 and the wireless signal processing apparatus 30.

The base station apparatus 20 performs communication between the control apparatus 10 and the wireless signal processing apparatus 30. The base station apparatus 20 is an apparatus that does not perform signal processing dependent on the wireless scheme. The wireless signal processing apparatus 30 performs communication between the control apparatus 10 and the base station apparatus 20. Each of the wireless signal processing apparatuses 30 performs signal processing that corresponds to each of the plurality of wireless schemes. For example, the wireless signal processing apparatus 30-1 performs signal processing that corresponds to the wireless scheme "(1)" (for example, LoRa), and the wireless signal processing apparatus 30-2 performs signal processing that corresponds to the wireless scheme "(2)" (for example, SIGFOX). The wireless signal processing apparatus 30 is an apparatus that performs signal processing dependent on the wireless scheme.

Figure 2:
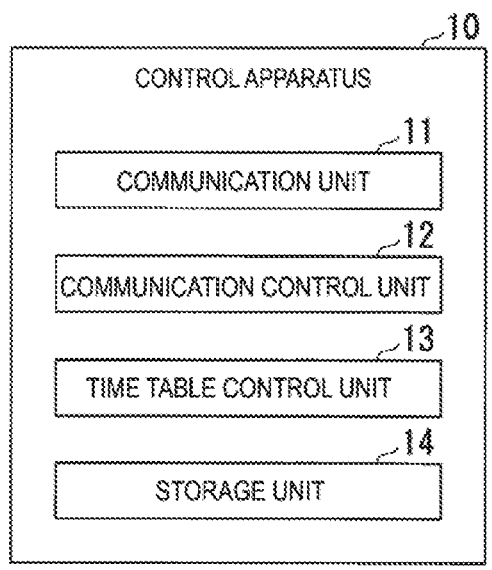
FIG. 2 is a schematic block diagram illustrating a functional configuration of a control apparatus according to an embodiment.

FIG. 2 is a schematic block diagram illustrating a functional configuration of the control apparatus 10 according to the embodiment.

The control apparatus 10 includes a communication unit 11, a communication control unit 12, a time table control unit 13, and a storage unit 14.

The communication unit 11 performs communication with the base station apparatus 20 and the wireless signal processing apparatus 30.

The communication control unit 12 controls communication of the communication unit 11.

The time table control unit 13 performs setting of various tables stored in the storage unit 14, setting of a time table stored by the base station apparatus 20, and setting of a time table stored by the wireless signal processing apparatus 30.

The storage unit 14 is configured using a storage device such as a magnetic hard disk device or a semiconductor storage device. The storage unit 14 stores various tables.

A table stored in the storage unit 14 will be described using FIG. 3 to FIG. 7. FIG. 3 to FIG. 7 are diagrams illustrating specific examples of the tables stored in the storage unit 14 of the control apparatus 10.

A table 51 illustrated in (A) of FIG. 3 includes "area" and items of "base station apparatus", and "phase". The value of the "area" is an area in which the base station apparatus 20 is installed. The value of the "base station apparatus" is a base station apparatus 20 installed in an area. A "base station apparatus $20\alpha 1$" to a "base station apparatus $20\alpha 6$" illustrated in (A) of FIG. 3 represents a "base station apparatus 20-1" to a "base station apparatus 20-6" installed in an area "$\alpha$". The value of the "phase" is a value that satisfies a value for shifting the time slot with respect to the base station apparatus 20. For example, in a case where the value of the "phase" is "+0 slot", the time slot that corresponds to the corresponding base station apparatus 20 is shifted by "+0 slot".

A table 52 illustrated in (B) of FIG. 3 includes the "area" and each item of the "facing wireless signal processing apparatuses (the number of slots is variable for each area) at each communication path setting time". The value of the "area" is an area in which the base station apparatus 20 is installed. The value of the "facing wireless signal processing apparatuses (the number of slots is variable for each area) at each communication path setting time" is a sequence of the basic time slots in the area. "Wireless signal processing apparatus 30(1)1", "wireless signal processing apparatus 30(2)1", "wireless signal processing apparatus 30(2)2", and "wireless signal processing apparatus 30(3)2" which are illustrated in (B) of FIG. 3 respectively represent the wireless signal processing apparatus 30-1 that performs signal processing by a wireless scheme "(1)", the wireless signal processing apparatus 30-1 that performs signal processing by a wireless scheme "(2)", the wireless signal processing apparatus 30-1 that performs signal processing by a wireless scheme "(2)", the wireless signal processing apparatus 30-2 that performs signal processing by the wireless scheme "(2)", and the wireless signal processing apparatus 30-1 that performs signal processing by a wireless scheme "(3)".

A table 53 illustrated in FIG. 4 includes the "area" and each item of the "base station apparatus" and the "facing wireless signal processing apparatus at each communication path setting time". The table 53 shows which wireless signal processing apparatus 30 performs communication at which timing for each base station apparatus 20 in each area. For example, it is shown that the base station apparatus 20-1" communicates with the "wireless signal processing apparatus 30-1" that performs signal processing by the wireless scheme "(1)" at the first slot in the "area $\alpha$". The table 53 is generated by the time table control unit 13 using the table 51 and the table 52. Specifically, the time table control unit 13 first refers to the table 51 and determines a combination of each base station apparatus 20 and the wireless signal processing apparatus 30 that performs communication with the base station apparatus 20 in each slot by shifting a time slot shown in the table 52 by a phase of each base station apparatus 20. The time table control unit 13 generates the table 53 for the base station apparatus 20 in all areas by determining a combination with the wireless signal processing apparatus 30 that performs communication with the base station apparatus 20 in each slot.

The table 54 illustrated in (A) of FIG. 5 includes each item of "wireless scheme", "base station apparatus control information", "communication path control information", and "wireless signal processing apparatus". The value of the "wireless scheme" is a wireless scheme used for signal processing. The value of the "base station apparatus control information" is control information set for the base station apparatus 20 when using each of the wireless schemes. The value of the "communication path control information" is a communication method for connecting the base station apparatus 20 and the wireless signal processing apparatus 30 to each other when using each of the wireless schemes. For example, it is shown that, in a case where the "communication method" of "communication path control information" is "multicast", the transmission is performed by the multicast from the wireless signal processing apparatus 30 to the plurality of base station apparatuses 20. The value of the "wireless signal processing apparatus" is a "communication method" of the "communication path control information" and a candidate list of the wireless signal processing apparatus 30 capable of processing each of the wireless schemes.

The table 55 illustrated in (B) of FIG. 5 has each item of "wireless signal processing apparatus", "base station apparatus", "communication path delay", and "adjustment delay". The value of the "wireless signal processing apparatus" represents the wireless signal processing apparatus 30. The value of the "base station apparatus" represents the base station apparatus 20 that is coupled to the wireless signal processing apparatus 30. The value of the "communication path delay" represents a delay in a communication path between each base station apparatus 20 and the wireless signal processing apparatus 30. The value of the "adjustment delay" represents the value for adjusting the delay. The time buffered in the wireless signal processing apparatus 30 or the base station apparatus 20 is adjusted by the adjustment delay in the table 55, and processing is performed to make the same communication delay front the wireless signal processing apparatus 30 to the plurality of base station apparatuses 20. In addition, sets of the wireless signal processing apparatus 30 and the base station apparatus 20 in the table 55 are all sets in which the wireless scheme can be performed.

The table 56 illustrated in (A) of FIG. 6 includes each item of "wireless scheme", "area", and "communication path setting time information". The value of the "wireless scheme" represents a wireless scheme used for signal processing. The value of the "area" represents an area in which the base station apparatus 20 in which each wireless scheme is used is installed. The value of the "communication path setting time information" represents the number of slots allocated to the wireless scheme in the area.

A table 57 illustrated in (B) of FIG. 6 has each item of "wireless scheme" and "wireless signal processing load per slot". The value of the "wireless scheme" represents a wireless scheme used for signal processing.

The value of the "wireless signal processing load per slot" represents a load per slot in a case where the wireless signal processing is performed using associated wireless schemes. The wireless signal processing load per slot is used to calculate the required number of wireless signal processing apparatuses 30.

A table 58 illustrated in (C) of FIG. 6 has each item of "apparatus" and "address". The value of the "apparatus" represents the base station apparatus 20 and the wireless signal processing apparatus 30. The value of the "address" represents the address of the associated apparatus.

A table 59 illustrated in (A) of FIG. 7 has each item of "virtualization apparatus", "VM", and "activation system". The value of the "virtualization apparatus" represents a physical apparatus that performs virtualization. The value of the "VM" represents a virtual apparatus executed on the virtualization apparatus. The value of the "activation system" represents the apparatus that has been activated by the VM.

In table 59, it is shown that a physical apparatus that performs virtualization is a "virtualization apparatus 1", virtual apparatuses executed on the "virtualization apparatus 1" are "VM1-1" and "VM1-2", an apparatus activated by the "VM1-1" is the "wireless signal processing apparatus 30-1" that performs signal processing by the wireless scheme "(1)", and the apparatus activated by the "VM1-2" is the "wireless signal processing apparatus 30-1" that performs signal processing by the wireless scheme "(2)".

A table 60 illustrated in (B) of FIG. 7 includes each item of "condition", "event", and "execution target area". The value of the "condition" represents a condition when executing an event. The "condition" is, for example, a time zone, a date, or the like. The value of the "event" represents an event executed when satisfying the condition. The value of the "execution target area" represents a target area where the event is to be executed.

In the table 60, it is shown that, in a case where the time information is from 00 to 10 (such as from 02:00 to 02:10, 03:00 to 03:10, and the like), an event that operates the wireless scheme "(1)" is executed in the area α, the area β, and . . . , and in other cases (the time information is divided from 10 to 00 (02:10 to 02:00, 03:10 to 03:00, and the like)), an operation for executing an event that deactivates the wireless scheme "(1)" in the area α, the area β, and . . . , is performed. In addition, the event for operating the wireless scheme is an update with respect to the table 56 to add an area for operating the wireless scheme.

Figures 8, 9:
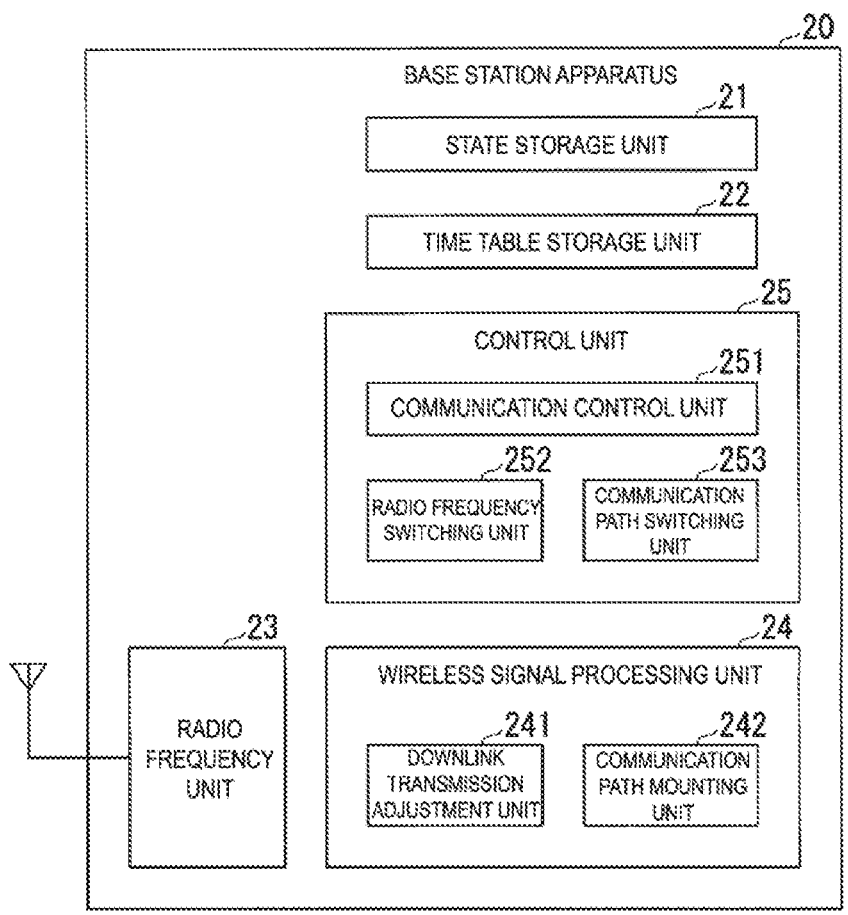
FIG. 8 is a schematic block diagram illustrating a functional configuration of a base station apparatus according to the embodiment.
FIG. 9 is a diagram illustrating an example of information stored in a state storage unit of the base station apparatus.

FIG. 8 is a schematic block diagram illustrating a functional configuration of the base station apparatus 20 according to the embodiment.

The base station apparatus 20 includes a state storage unit 21, a time table storage unit 22, a radio frequency unit 23, a wireless signal processing unit 24, and a control unit 25.

The state storage unit 21 stores information related to the current state of the host apparatus. For example, the state storage unit 21 stores information related to the current state of the base station apparatus 20 in the sets of variables and values, as illustrated in FIG. 9. FIG. 9 is a diagram illustrating an example of information stored in the state storage unit 21 of the base station apparatus 20. As illustrated in FIG. 9, as a specific example of variables, there are "host apparatus address", "entry being selected", "remaining time slot", and "facing wireless signal processing apparatus". The value of the "host apparatus address" represents the address of the base station apparatus 20. The value of the "entry being selected" represents an entry being selected by the base station apparatus 20. The value of the "remaining time slot" represents the number of remaining time slots that can perform transmission and reception in the entry being selected. The value of the "facing wireless signal processing apparatus" represents an address of the facing wireless signal processing apparatus 30 that is transmitted and received at the entry being selected.

The time table storage unit 22 stores a time table. The time table stored in the time table storage unit 22 is a time table set by the control apparatus 10, and information specifying the contents of operation of the base station apparatus 20 is stored. For example, the time table storage unit 22 stores a time table 61 as illustrated in FIG. 10. FIG. 10 is a diagram illustrating an example of the time table.

The time table 61 has each item of "time slot", "communication path setting time information", "communication path control information", and "radio frequency control information". The value of the "time slot" represents the identification information of the time slot entry. The value of the "communication path setting time information" represents the time (number of slots) for which the entry indicated by the identification information of the time slot entry is valid. The value of the "communication path control information" represents the address of the wireless signal processing apparatus 30 that is the target of exchanging baseband packets with the base station apparatus 20 in the entry. The value of the "radio frequency control information" represents information set to the radio frequency unit 23 in the base station apparatus 20 in the entry. An example of the "radio frequency control information" includes, for example, center frequency and bandwidth.

The radio frequency unit 23 has a function of converting an analog wireless signal received from an antenna to a digital wireless signal and outputting the converted signal to the wireless signal processing unit 24, and a function of converting the digital wireless signal output from the wireless signal processing unit 24 to an analog wireless signal and transmitting the converted signal to the antenna.

The wireless signal processing unit 24 includes a downlink transmission adjustment unit 241 and a communication path mounting unit 242. The wireless signal processing unit 24 has a function of converting a digital wireless signal output from the radio frequency unit 23 into an uplink packet of a baseband and transmitting the converted signal to the network via the communication path mounting unit 242, a function of holding the downlink packet received from the network via the communication path mounting unit 242 by the downlink transmission adjustment unit 241, and a function of converting the downlink packet from the baseband to the digital wireless signal and transmitting the converted signal to the radio frequency unit 23.

The downlink transmission adjustment unit 241 temporarily holds the downlink packet until the transmission timing of the downlink packet is reached, and outputs the downlink packet to the radio frequency unit 23 when the transmission timing of the held downlink packet is reached. The downlink transmission adjustment unit 241 operates based on the table illustrated in FIG. 11. FIG. 11 is a diagram illustrating an example of a table stored in the downlink transmission adjustment unit 241 of the base station apparatus 20. The table 62 illustrated in FIG. 11 has each item of "entry of time slot for performing transmission", "wireless signal processing apparatus to which packet has transmitted", and "transmission waiting packet list".

The value of the "entry of time slot for performing transmission" represents a key that searches for an entry corresponding to the time slot. The value of the "wireless signal processing apparatus to which packet has transmitted" represents an address of the wireless signal processing apparatus 30 to which the downlink packet is transmitted. The value of the "transmission waiting packet list" represents a list that stores the packet that is being held.

The downlink transmission adjustment unit 241 outputs the downlink packet to the radio frequency unit 23 in the following manner.

First, based on the table 62 from the transmission source address described in a wireless scheme independent header unit included in the downlink packet received by the wireless signal processing unit 24, the wireless signal processing apparatus 30 to which the packet is transmitted is specified. Next, during the time until entry of time slot for performing transmission related to the wireless scheme of the specified wireless signal processing apparatus 30 becomes valid, the downlink packet is recorded and held in the entry in which the wireless signal processing apparatus 30 that has received the same downlink packet as the specified wireless signal processing apparatus 30 of the table 62 is written.

Next, when the entry of time slot for performing transmission related to the wireless scheme of the specified wireless signal processing apparatus 30 is valid, the downlink packet is output to the radio frequency unit 23 in the order of arrival from the "list of transmission waiting downlink packet".

The communication path mounting unit 242 performs the insertion and removal of the wireless scheme independent header unit in order to perform communication with the wireless signal processing apparatus via the network 40.

The control unit 25 includes a communication control unit 251, a radio frequency switching unit 252, and a communication path switching unit 253.

The communication control unit 251 controls communication with the wireless signal processing apparatus 30.

The radio frequency switching unit 252 sets "center frequency" or "bandwidth" registered in the "radio frequency control information" of the table 61 to the radio frequency unit 23. The communication path switching unit 253 sets the "host apparatus address" and the "facing wireless signal processing apparatus" stored in the state storage unit 21 to the communication path mounting unit 242 such that the communication path mounting unit 242 can insert and remove the wireless scheme independent header unit.

FIG. 12 is a diagram illustrating an example of a format of the packet exchanged over the network 40 between the base station apparatus 20 and the wireless signal processing apparatus 30. As illustrated in FIG. 12, the packet 63 is configured with the wireless scheme independent header unit, a header unit for each wireless scheme, and a user packet unit for each wireless scheme. The wireless scheme independent header unit is a header in which information that is not dependent on the wireless scheme is stored, and has, for example, a field that stores a transmission destination address of the communication path and the transmission source address of the communication path. The header unit for each wireless scheme is a header in which information that is dependent on the wireless scheme is stored, and has, for example, a field for storing a wireless scheme or the like. The user packet unit for each wireless scheme has a field that stores the transmission destination address of the user packet, the transmission source address of the user packet, and a payload of the user packet.

Figures 13, 14:
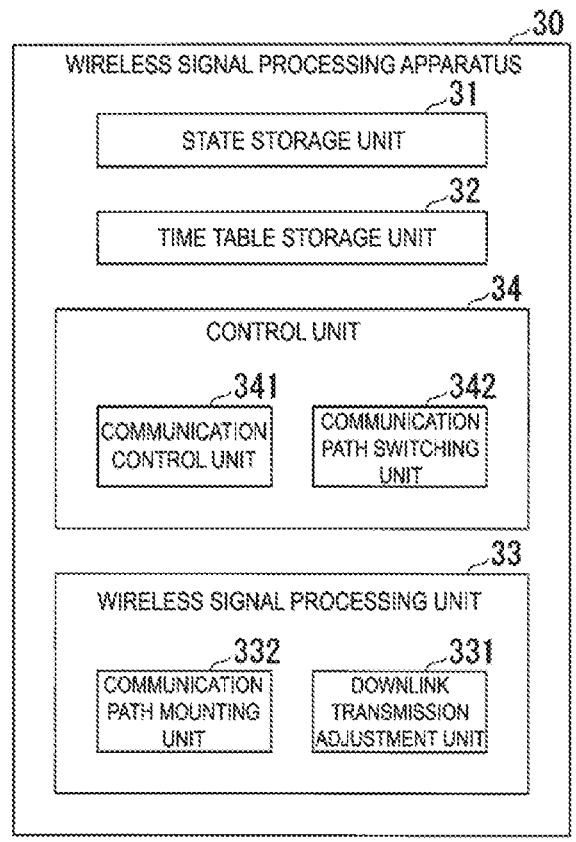
FIG. 13 is a schematic block diagram illustrating a functional configuration of the wireless signal processing apparatus according to the embodiment.
FIG. 14 is a diagram illustrating an example of information stored in the state storage unit of the wireless signal processing apparatus.

FIG. 13 is a schematic block diagram illustrating a functional configuration of the wireless signal processing apparatus 30 according to the embodiment.

The wireless signal processing apparatus 30 includes a state storage unit 31, a time table storage unit 32, a wireless signal processing unit 33, and a control unit 34.

The state stage unit 31 stores information related to the current state of the host apparatus. For example, the state storage unit 31 stores information on the current state of the wireless signal processing apparatus 30 in sets of variables and values, as illustrated in FIG. 14. FIG. 14 is a diagram illustrating an example of information stored in the state storage unit 31 of the wireless signal processing apparatus 30. As illustrated in FIG. 14, as a specific example of variables, there are "host apparatus address". "entry being selected" for each area, and "remaining time slot". The value of the "host apparatus address" represents the address of the wireless signal processing apparatus 30. The value of the "entry being selected" represents an entry that is being selected in the time table stored in the time table storage unit 32.

The value of the "remaining time slot" represents the number of remaining time slots that can perform transmission and reception in the entry being selected.

The time table storage unit 32 stores a time table. The time table stored in the time table storage unit 32 is a time table set by the control apparatus 10, and information specifying the contents of operation of the wireless signal processing apparatus 30 is stored. For example, the time table storage unit 32 stores a time table 64 as illustrated in FIG. 15. FIG. 15 is a diagram illustrating an example of the time table.

The time table 64 has each item of "area", "time slot", "communication path setting time information", and "communication path control information". The value of the "area" represents each area. The value of the "time slot" represents the identification information of the time slot entry. The value of the "communication path setting time information" represents the time (number of slots) for which the entry indicated by the identification information of the time slot entry is valid. The value of the "communication path control information" represents the address of the base station apparatus 20 that is the target of exchanging baseband packets with the wireless signal processing apparatus 30 in the entry.

The wireless signal processing unit 33 includes a downlink transmission adjustment unit 331 and a communication path mounting unit 332. The wireless signal processing unit 33 has a function of reading the header unit for each wireless scheme for the uplink packet received from the network via the communication path mounting unit 332, performing processing related to the wireless scheme, and performing transmission to the outside, a function of holding the downlink packet received from the outside by the downlink transmission adjustment unit 331, and a function of transmitting the downlink packet to the network via the communication path mounting unit 332.

The downlink transmission adjustment unit 331 temporarily holds the downlink packet until the transmission timing of the downlink packet is reached, and transmits the downlink packet to the base station apparatus 20 via the communication path mounting unit 332 when the transmission timing of the held downlink packet is reached. The downlink transmission adjustment unit 331 operates based on the table illustrated in FIG. 16. FIG. 16 is a diagram illustrating an example of a table stored in the downlink transmission adjustment unit 331 of the wireless signal processing apparatus 30. A table 65 illustrated in FIG. 16 has each item of "area", "entry of time slot for performing transmission". "packet transmission destination base station apparatus", and "transmission waiting packet list".

The value of the "area" represents a key that searches for association with each area. The value of the "entry of time slot for performing transmission" represents a key that searches for an entry corresponding to the time slot. The value of the "packet transmission destination base station apparatus" represents the address of the base station apparatus 20 which is the transmission destination of the packet in the entry of the time slot. The value of the "transmission waiting packet list" represents a list that stores the packet that is being held.

The downlink transmission adjustment unit 331 transmits the downlink packet to the base station apparatus 20 of the transmission destination in the following manner.

First, based on the table 65 from the transmission destination address and the transmission source address of the user packet of the user packet unit for each wireless scheme described in the downlink packet received by the wireless signal processing unit 33, the base station apparatus 20 which is the transmission destination of the packet is determined by the existing technology.

Next, when an entry of time slot for performing transmission to the base station apparatus 20 of the transmission destination of the packet is valid, the downlink packet is transmitted to the base station apparatus 20 of the transmission destination via the communication path mounting unit 332 in the order of arrival from the "list of transmission waiting downlink packet".

The communication path mounting unit 332 performs the insertion and removal of the wireless scheme independent header unit in order to perform communication with the base station apparatus 20 via the network 40.

The control unit 34 includes a communication control unit 341 and a communication path switching unit 342.

The communication control unit 341 performs control communication with the control apparatus 10. The communication path switching unit 342 sets the "host apparatus address" stored in the state storage unit 31 in the communication path mounting unit 332 such that the communication path mounting unit 332 can insert and remove the wireless scheme independent header unit.

Figure 17:
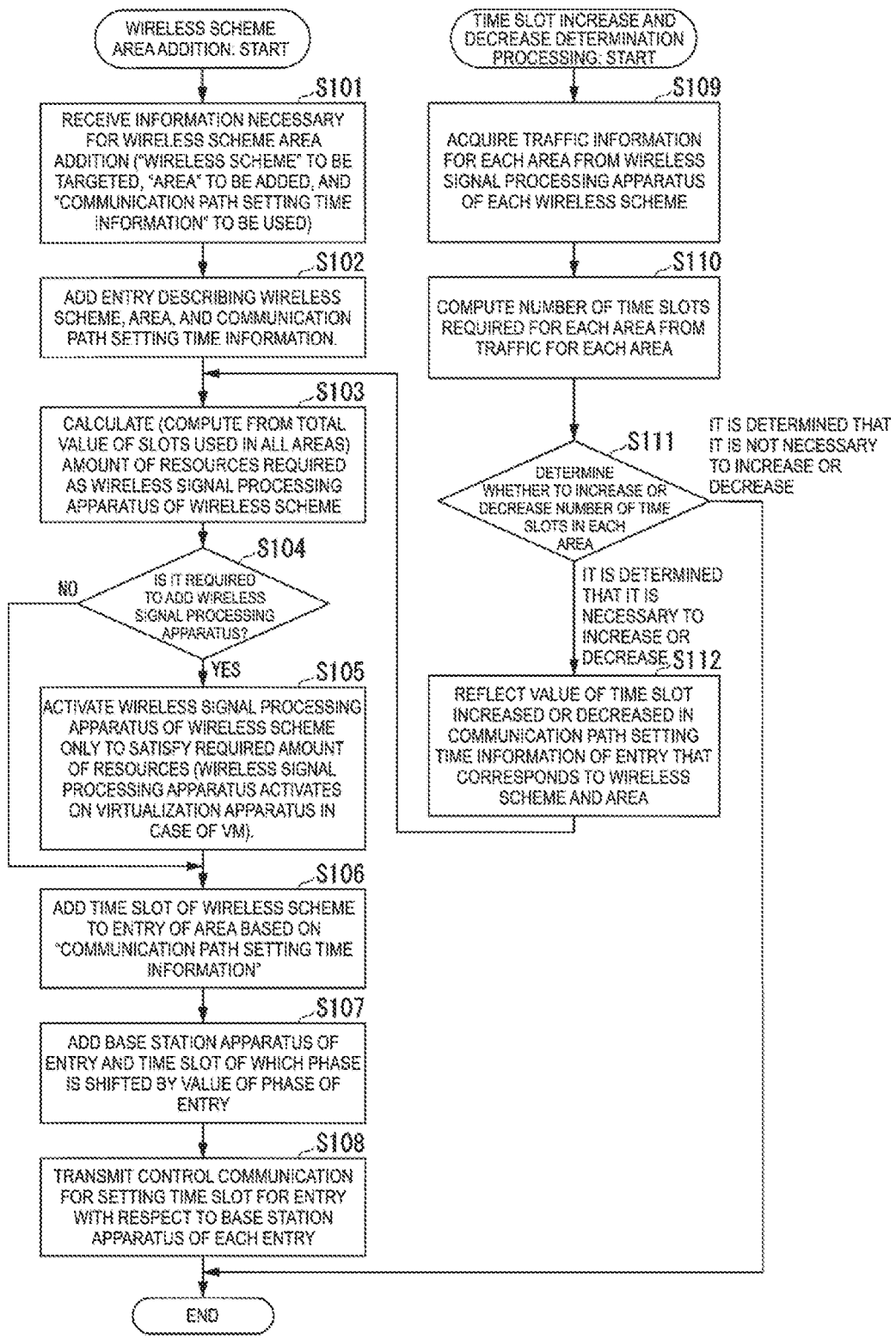
FIG. 17 is a flowchart illustrating a flow of processing of the control apparatus.

FIG. 17 is a flowchart illustrating a flow of processing of the control apparatus 10. The event that initiates the flowchart illustrated in FIG. 17 is a wireless scheme area addition and time slot increase and decrease determination processing.

An event of the wireless scheme area addition occurs when an area is added by a wireless scheme to the table 56 by any one of execution of an operation for adding an area by a wireless scheme to the table 56 manually by a wireless infrastructure operator, and execution of an event of an operation by a wireless scheme by executing an event that matches the "conditions" of the table 60. When an event of the wireless scheme area addition occurs, the communication unit 11 receives information (for example, "wireless scheme" to be targeted, "area" to be added, and "communication path setting time information" to be used) required for the wireless scheme area addition (step S101).

Based on the received information, the time table control unit 13 adds an entry describing the received wireless scheme, the area, and the communication path setting time information to the table 56 (step S102). Thereafter, the time table control unit 13 calculates (computes from the total value of the slots used in all areas) an amount of resources required as the wireless signal processing apparatus 30 of the wireless scheme (step S103). Based on the table 53 and the table 57, the time table control unit 13 determines whether the wireless signal processing apparatus 30 needs to be added (step S104).

In a case where the wireless signal processing apparatus 30 needs to be added (YES in step S104), the time table control unit 13 activates the wireless signal processing apparatus of the wireless scheme only to satisfy the amount of the required resources (the wireless signal processing apparatus activates on the virtualization apparatus in a case of the VM) (step S105). After the processing of step S105, or in a case where the wireless signal processing apparatus 30 needs not to be added (NO in step S104), the time table control unit 13 adds the time slot of the wireless scheme to the entry of the area of the table 52 based on the "communication path setting time information" (step S106). In addition, in the processing of step S104, the time table control unit 13 deactivates the operation of the unnecessary wireless signal processing apparatus in a case where the wireless signal processing apparatus 30 needs not to be added and in a case where the number of wireless signal processing apparatuses to be operated in accordance with the amount of resources of the wireless signal processing is large.

The time table control unit 13 extracts entries in the area of the table 51, and adds the base station apparatus 20 of the entry and the result of the phase shift of the time slot of the entry in the area of the table 52 by the value of the phase of the entry, as entries in the table 53 (step S107). Then, the communication unit 11 extracts each entry of the table 53, and transmits information for setting a tune slot of the entry for the base station apparatus 20 of each entry (step S108).

An event of the time slot increase and decrease determination processing is performed periodically. When an event of the time slot increase and decrease determination processing occurs, the communication control unit 12 acquires the traffic information for each area from the wireless signal processing apparatus 30 of each wireless scheme (step S109), Then, the time table control unit 13 computes the number of time slots required for each area from the amount of traffic in each area (step S110). In addition, as the method for computing the number of time slots required for each area from the traffic amount, for example, a method such as combining the relationship between the number of terminals, the traffic amount, and the required number of time slots, and statistical data. The time table control unit 13 determines whether to increase or decrease the number of time slots in each area based on the computed required number of time slots (step S111).

In a case where it is determined that it is necessary to increase or decrease the number of time slots as a result of determining the necessity of the increase or decrease in number of time slots of each area (Necessary to increase or decrease in step S111), the time table control unit 13 executes processing of reflecting the value of the time slot that has increased or decreased to the wireless scheme and the communication path setting time information of the entry that corresponds to the area in the table 56 (step S112), and after this, the processing from step S103 is executed. Meanwhile, in a case where it is determined that it is not necessary to increase or decrease the number of time slots (Not necessary to increase or decrease in step S111), the control apparatus 10 terminates the processing in FIG. 17.

Figure 18:
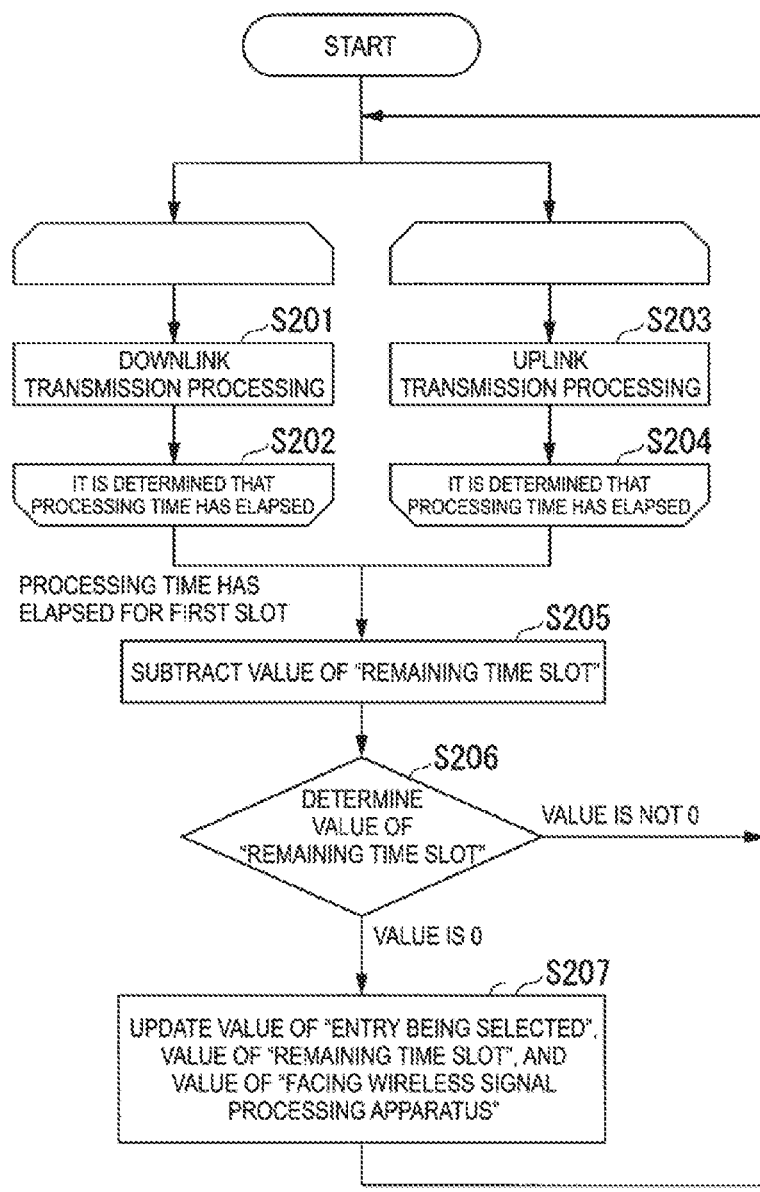
FIG. 18 is a flowchart illustrating a flow of transmission and reception processing in the base station apparatus.

FIG. 18 is a flowchart illustrating a flow of transmission and reception processing in the base station apparatus 20.

The base station apparatus 20 executes each of the downlink transmission processing and the uplink transmission processing in parallel. In the downlink transmission processing, the downlink transmission adjustment unit 241 selects the record that corresponds to the entry in which the value of the "entry of time slot for performing transmission" matches the value of the "entry being selected" stored in the state storage unit 21 among the entries registered in the table 62. The downlink transmission adjustment unit 241 extracts the lead packet held as the "list of transmit waiting packet" of the selected record. The communication path mounting unit 242 removes the "wireless scheme independent header unit" from the extracted packet and outputs the packet to the radio frequency unit 23 (step S201).

The radio frequency switching unit 252 selects the record that corresponds to the entry matching the value of the "entry being selected" stored in the state storage unit 21 among the entries registered in the table 61, The radio frequency switching unit 252 sets the center frequency and the bandwidth of the "radio frequency control information" of the selected record to the radio frequency unit 23. The radio frequency unit 23 transmits the packet output from the downlink transmission adjustment unit 241.

The base station apparatus 20 repeatedly executes the downlink transmission processing until a processing time of one slot has elapsed due to the determination of the processing elapsed time (step S202). In addition, a plurality of packets may be processed at a time of one slot.

In the uplink transmission processing, the communication path mounting unit 242 gives the "wireless scheme independent header unit" to the signal output from the radio frequency unit 23, and stores the address indicated by the "facing wireless signal processing apparatus" stored in the state storage unit 21 in a field of the "transmission destination address of the communication path" of the given header unit. In addition, the communication path mounting unit 242 stores the address indicated by the "host apparatus address" stored in the state storage unit 21 in the field of the "transmission source address of the communication path" of the given header unit (step S203). The base station apparatus 20 repeatedly executes the uplink transmission processing until a processing time of one slot has elapsed due to the determination of the processing elapsed time (step S204). In addition, a plurality of packets may be processed at a time of one slot.

When the processing time of one slot has elapsed, the communication control unit 251 subtracts the value of the "remaining time slot" stored in the state storage unit 21 (step S205), Thereafter, the communication control unit 251 determines the value of the remaining time slot (step S206). In a case where the value of the remaining time slot is not "0" (NO in step S206), the base station apparatus 20 executes the processing after step S201.

Meanwhile, in a case where the value of the remaining time slot is "0" (YES in step S206), the communication control unit 251 selects the entry (first entry in a case where there is no next entry) next to the entry in which the value of the "time slot" matches the value of the "entry being selected" stored in the state storage unit 21 among the entries registered in the table 61, and updates the value by storing the value of the "time slot" of the entry, the value of the "communication path setting time information", and the value of the "facing wireless signal processing apparatus" respectively to the value of the "entry being selected" stored in the state storage unit 21, the value of the "remaining time slot", and the value of the "facing wireless signal processing apparatus" (step S207). Thereafter, the transmission and reception processing is performed in an entry of the next time slot.

Figure 19:
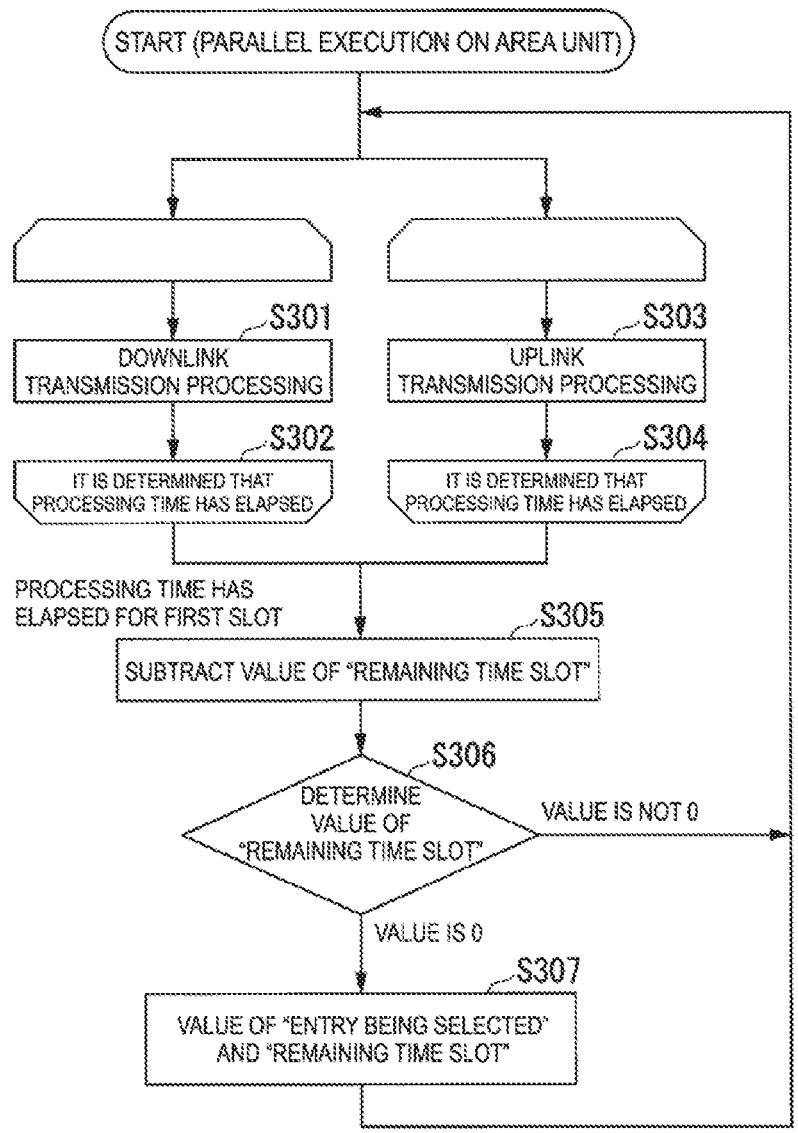
FIG. 19 is a flowchart illustrating a flow of transmission and reception processing in the wireless signal processing apparatus.

FIG. 19 is a flowchart illustrating a flow of the transmission and reception processing in the wireless signal processing apparatus 30.

The wireless signal processing apparatus 30 executes each of the downlink transmission processing and the uplink transmission processing in parallel. In the downlink transmission processing, the downlink transmission adjustment unit 331 selects the record that corresponds to the entry in which the value of the "entry of time slot for performing transmission" matches the value of the "entry being selected" stored in the state storage unit 31 among the entries registered in the table 65. The downlink transmission adjustment unit 331 extracts the lead packet held as the "list of transmit waiting packet" of the selected record. The communication path mounting unit 332 gives the "wireless scheme independent header unit" to the extracted packet, and stores the address indicated by the "packet transmission destination base station apparatus" of the entry in the field of the "transmission destination address of the communication path" of the given header unit. In addition, the downlink transmission adjustment unit 331 stores the address indicated by the "host apparatus address" stored in the state storage unit 31 in the field of the "transmission source address of the communication path" of the given header unit (step S301). The wireless signal processing apparatus 30 repeatedly executes the downlink transmission processing until a processing time of one slot has elapsed due to the determination of the processing elapsed time (step S302). In addition, a plurality of packets may be processed at a time of one slot.

In the uplink transmission processing, the communication path mounting unit 332 removes the "wireless scheme independent header unit" from the packet received via the network 40, performs processing for each wireless scheme, and transmits the packet to the outside of the wireless communication system 100 (step S303).

The wireless signal processing apparatus 30 repeatedly executes the uplink transmission processing until a processing time of one slot has elapsed due to the determination of the processing elapsed time (step S304) In addition, a plurality of packets may be processed at a time of one slot.

When the processing time of one slot has elapsed, the communication control unit 341 subtracts the value of the "remaining time slot" stored in the state storage unit 31 (step S305). Thereafter, the communication control unit 341 determines the value of the remaining time slot (step S306). In a case where the value of the remaining time slot is not "0" (NO in step S306), the wireless signal processing apparatus 30 executes the processing after step S301.

Meanwhile, in a case where the value of the remaining time slot is "0" (YES in step S306), the communication control unit 341 selects the entry (first entry in a case where there is no next entry) next to the entry in which the value of the "time slot" matches the value of the "entry being selected" stored in the state storage unit 31 among the entries registered in the table 64, and updates the value by storing the value of the "time slot" of the entry and the value of the "communication path setting time information" respectively to the value of the "entry being selected" stored in the state storage unit 31 and the value of the "remaining time slot" (step S307). Thereafter, the transmission and reception processing is performed in an entry of the next time slot.

According to the wireless communication system 100 configured as described above, the control apparatus 10 is configured to perform control such that there is less overlap in time to establish a communication path between each of the plurality of base station apparatuses 20 that use the same wireless signal processing apparatus 30 and the wireless signal processing apparatus 30, and accordingly, the plurality of base station apparatuses 20 can share one wireless signal processing apparatus 30, and to shorten the non-communication time for changing the wireless scheme without increasing the resources of the wireless signal processing unit 24 in the base station apparatus 20.

In addition, the control apparatus 10 performs control such that there is less overlap in time to establish a communication path between the plurality of base station apparatuses 20 that use the same wireless signal processing apparatus 30 and the wireless signal processing apparatus 30, and accordingly, by using the concentration of the load on the wireless signal processing apparatus 30, for example, by using the same wireless scheme at the same time by the plurality of base station apparatuses 20, it is possible to prevent a state where a high processing capacity is required in one wireless signal processing apparatus 30. Moreover, the resources consumed by the wireless signal processing apparatus 30 for processing the traffic can be minimized.

The base station apparatus 20 can prevent the occurrence of packet loss in the base station apparatus 20 by providing the following functions.

First Function

A function of storing signals received from each of the plurality of wireless signal processing apparatuses 30 in association with:

the time table 61 (first time table) stores the timing for transmission to the radio frequency unit 23 the wireless scheme that corresponds to the received wireless signal processing apparatus 30 or the wireless signal processing apparatus 30

Second Function

A function of transmitting the signal stored in the first function to the radio frequency unit 23 in accordance with the time table 61

In addition, the wireless signal processing apparatus 30 has a function of storing the time table 64 that stores timing for transmitting signals to one or more base station apparatuses 20, and the downlink packet received from the outside in association with the base station apparatus 20 which is the transmission destination, and holding the stored time table 64 and the downlink packet until the transmission timing, and accordingly, it is possible to prevent the occurrence of packet loss in the wireless signal processing apparatus 30.

Moreover, as the control apparatus 10 has the following two functions, the resources consumed by the wireless signal processing apparatus 30 for processing the traffic can be minimized.

First Function

A function of creating the table 53 such that there is less overlap in time to establish a communication path between the plurality of base station apparatuses 20 that use the same wireless signal processing apparatus 30 and the wireless signal processing apparatus, determining a quantity of the wireless signal processing apparatuses 30 to be activated by the processing load amount of the wireless signal processing, and activating or deactivating the wireless signal processing apparatus 30

Second Function

A function of increasing or decreasing the number of time slots allocated for each wireless scheme in each area based on either the number of terminal connections or the traffic conditions of each wireless scheme The control apparatus 10, the base station apparatus 20, and the wireless signal processing apparatus 30 in the above-described embodiment may be implemented with a computer. In such a case, the radio wave environment estimation apparatuses 1, 2, and 3 may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. Specific configurations, however, are not limited to those embodiments, and include any design or the like within the scope not departing from the gist of the present invention.

REFERENCE SIGNS LIST

10 Control apparatus
11 Communication unit
12 Communication control unit
13 Time table control unit
14 Storage unit
20 (20-1 to 20-M) Base station apparatus
21 State storage unit
22 Time table storage unit
23 Radio frequency unit
24 Wireless signal processing unit
241 Downlink transmission adjustment unit
242 Communication path mounting unit
25 Control unit
251 Communication control unit
252 Radio frequency switching unit
253 Communication path switching unit
30 (30-1 to 30-N) Wireless signal processing apparatus
31 State storage unit
32 Time table storage unit
33 Wireless signal processing unit
331 Downlink transmission adjustment unit
332 Communication path mounting unit
34 Control unit
341 Communication control unit
342 Communication path switching unit
40 Network

The invention claimed is:

1. A wireless communication method in a wireless communication system including a plurality of base station apparatuses, a plurality of wireless signal processing apparatuses configured to perform signal processing that corresponds to each of a plurality of wireless schemes, and a control apparatus configured to control a transmission timing of signals in the base station apparatus and the wireless signal processing apparatus, the method comprising:
   determining a combination of the base station apparatus and the wireless signal processing apparatus that perform communication at each predetermined time by the control apparatus such that there is less overlap in time for establishing a communication path between the wireless signal processing apparatus and each of a plurality of base station apparatuses that use a same wireless signal processing apparatus, wherein
   the base station apparatus and the wireless signal processing apparatus perform communication by switching any or all of a determined combination of the communication paths, a radio frequency of each base station apparatus, and a wireless bandwidth of each base station apparatus over time.

2. The wireless communication method of claim 1, wherein
   the control apparatus determines a number of the wireless signal processing apparatuses that are activated based on a processing load of wireless signal processing and activates or deactivates the wireless signal processing apparatus in response to a determined number.

3. The wireless communication method according to claim 1, wherein
   the base station apparatus transmits, via a radio frequency unit, signals received from each of the wireless signal processing apparatuses to an outside in accordance with a first time table that stores timing for outputting the signal to the radio frequency units that transmit signals received from each of the wireless signal processing apparatuses to the outside.

4. The wireless communication method according to claim 1, wherein
   the wireless signal processing apparatus stores the signal received from the outside and the base station apparatus that is a transmission destination of the signal, in association with each other, and transmits the signal held to the base station apparatus that is a transmission destination at a time when the signal is transmitted to the base station apparatus that is the transmission destination.

5. A control apparatus in a wireless communication system including a plurality of base station apparatuses, a plurality of wireless signal processing apparatuses configured to perform signal processing that corresponds to each of a plurality of wireless schemes, and a control apparatus configured to control a transmission timing of signals in the base station apparatus and the wireless signal processing apparatus, the device comprising:
   a processor; and
   a storage medium having computer program instructions stored thereon, when executed by the processor, perform to:
   determine a combination of the base station apparatus and the wireless signal processing apparatus that perform communication at each predetermined time such that there is less overlap in time to establish a communication path between the wireless signal processing apparatus and each of the plurality of base station apparatuses that use a same wireless signal processing apparatus;
   generate a table instructing to perform communication by switching a determined combination of the communication paths between the base station apparatus and the wireless signal processing apparatus and any one or all of a radio frequency of each base station apparatus and a wireless bandwidth of each base station apparatus over time; and
   control a transmission timing of the signal by setting control information based on the generated table to the base station apparatus and the wireless signal processing apparatus.

6. A wireless communication system including a plurality of base station apparatuses, a plurality of wireless signal processing apparatuses configured to perform signal processing that corresponds to each of a plurality of wireless schemes, and a control apparatus configured to control a transmission timing of signals in the base station apparatus and the wireless signal processing apparatus, the system comprising:
- a processor; and
- a storage medium having computer program instructions stored thereon, when executed by the processor, perform to:
- determine a combination of the base station apparatus and the wireless signal processing apparatus that perform communication at each predetermined time by the control apparatus such that there is less overlap in time to establish a communication path between the wireless signal processing apparatus and each of a plurality of base station apparatuses that use a same wireless signal processing apparatus, wherein
- the base station apparatus and the wireless signal processing apparatus perform communication by switching a determined combination of the communication paths and any one or all of a radio frequency of each base station apparatus and a wireless bandwidth of each base station apparatus over time.

\* \* \* \* \*